United States Patent
Onodera et al.

(10) Patent No.: US 10,516,187 B2
(45) Date of Patent: Dec. 24, 2019

(54) NONAQUEOUS ELECTROLYTE FOR SODIUM SECONDARY BATTERY AND SODIUM SECONDARY BATTERY

(71) Applicant: SUMITOMO CHEMICAL COMPANY, LIMITED, Tokyo (JP)

(72) Inventors: Toru Onodera, Ichihara (JP); Hidenaka Tanaka, Tsukuba (JP); Takitaro Yamaguchi, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 100 days.

(21) Appl. No.: 15/559,501

(22) PCT Filed: Mar. 18, 2016

(86) PCT No.: PCT/JP2016/058653
§ 371 (c)(1),
(2) Date: Sep. 19, 2017

(87) PCT Pub. No.: WO2016/152761
PCT Pub. Date: Sep. 29, 2016

(65) Prior Publication Data
US 2018/0123170 A1 May 3, 2018

(30) Foreign Application Priority Data
Mar. 25, 2015 (JP) .................. 2015-062133

(51) Int. Cl.
| | | |
|---|---|---|
| *H01M 10/052* | (2010.01) | |
| *H01M 10/0567* | (2010.01) | |
| *H01M 4/525* | (2010.01) | |
| *H01M 4/505* | (2010.01) | |
| *H01M 10/0525* | (2010.01) | |
| *H01M 4/485* | (2010.01) | |
| *H01M 4/587* | (2010.01) | |
| *H01M 10/054* | (2010.01) | |
| *H01M 10/0568* | (2010.01) | |
| *H01M 10/0569* | (2010.01) | |

(52) U.S. Cl.
CPC ....... *H01M 10/0567* (2013.01); *H01M 4/485* (2013.01); *H01M 4/505* (2013.01); *H01M 4/525* (2013.01); *H01M 4/587* (2013.01); *H01M 10/052* (2013.01); *H01M 10/054* (2013.01); *H01M 10/0525* (2013.01); *H01M 10/0568* (2013.01); *H01M 10/0569* (2013.01); *H01M 2300/0025* (2013.01); *H01M 2300/0037* (2013.01)

(58) Field of Classification Search
CPC ........... H01M 10/052; H01M 10/0525; H01M 10/0567; H01M 10/0569; H01M 2300/0025; H01M 2300/0037; H01M 4/485; H01M 4/505; H01M 4/525; C07C 303/28
USPC ........................................................ 429/338
See application file for complete search history.

(56) References Cited

U.S. PATENT DOCUMENTS

| | | | | |
|---|---|---|---|---|
| 7,972,733 | B2 * | 7/2011 | Lee ................... | H01M 10/0567 429/212 |
| 9,673,484 | B2 * | 6/2017 | Lee ....................... | H01M 4/139 |
| 2007/0105022 | A1 | 5/2007 | Xiao et al. | |
| 2012/0015256 | A1 * | 1/2012 | Komaba ............. | H01M 10/054 429/331 |
| 2013/0130128 | A1 | 5/2013 | Okamoto et al. | |
| 2013/0143129 | A1 * | 6/2013 | Okamoto .......... | H01M 10/0567 429/338 |
| 2015/0303517 | A1 | 10/2015 | Kageura | |
| 2016/0049691 | A1 | 2/2016 | Suzuki et al. | |
| 2017/0025706 | A1 * | 1/2017 | Dahn ................ | H01M 10/0567 |

FOREIGN PATENT DOCUMENTS

| | | | | |
|---|---|---|---|---|
| EP | 3 165 528 A1 | 5/2017 | | |
| FR | 2993886 A1 * | 1/2014 | ........... | C07C 303/28 |
| JP | 2009-093839 A | 4/2009 | | |
| JP | 2014-112538 A | 6/2014 | | |
| JP | 2016-027028 A | 2/2016 | | |
| WO | 2010/109889 A1 | 9/2010 | | |
| WO | 2012/017998 A1 | 2/2012 | | |
| WO | 2012/017999 A1 | 2/2012 | | |
| WO | 2013/137351 A1 | 9/2013 | | |

OTHER PUBLICATIONS

International Search Report for PCT/JP2016/058653, dated Jun. 21, 2016.
Translation of International Preliminary Report on Patentability dated Oct. 5, 2017, in counterpart International Application No. PCT/JP2016/058653.
Communication dated Oct. 16, 2018, from Japanese Patent Office in counterpart application No. 2015-062133.
Communication dated Sep. 21, 2018, from the European Patent Office in counterpart European Application No. 16768664.1 containing Extended European Search Report dated Sep. 5, 2018.
Amrtha Bhide et al.: "Electrochemical stability of non-aqueous electrolytes for sodium-ion batteries and their compatibility with $Na_{0.7}CoO_2$", Physical Chemistry Chemical Physics., Nov. 22, 2013 vol. 16, No. 5, pp. 1987-1998, XP055502627, ISSN: 1463-9076 (12 pages total).
Office Action dated Apr. 2, 2019 from the State Intellectual Property Office of People's Republic of China in counterpart application No. 201680017165.7.
Communication dated Aug. 9, 2019 in European Patent Application No. 16768664.1.
Sheng Shui Zhang: "A review on electrolyte additives for lithium-ion batteries", Journal of Power Sources, vol. 162, No. 2, Nov. 1, 2006, pp. 1379-1394.

* cited by examiner

*Primary Examiner* — Amanda C. Walke
(74) *Attorney, Agent, or Firm* — Sughrue Mion, PLLC

(57) ABSTRACT

There is provided a nonaqueous electrolyte solution for the sodium secondary battery including a sodium salt, a compound having a sulfur-oxygen bond, and a nonaqueous solvent in which an amount of the compound having the sulfur-oxygen bond is in a rage of 0.05% by weight or more and 10% by weight or less with respect to the nonaqueous electrolyte solution. According to the present invention, the nonaqueous electrolyte solution for the sodium secondary battery and the sodium secondary battery which have excellent charge-discharge cycle characteristics can be provided and is useful industrially.

9 Claims, No Drawings

NONAQUEOUS ELECTROLYTE FOR SODIUM SECONDARY BATTERY AND SODIUM SECONDARY BATTERY

CROSS REFERENCE TO RELATED APPLICATIONS

This application is a National Stage of International Application No. PCT/JP2016/058653 filed Mar. 18, 2016, claiming priority based on Japanese Patent Application No. 2015-062133 filed Mar. 25, 2015, the contents of all of which are incorporated herein by reference in their entirety.

TECHNICAL FIELD

This invention is concerning a nonaqueous electrolyte solution for a sodium secondary battery and a sodium secondary battery.

BACKGROUND ART

A nonaqueous electrolyte solution is given as an electrolyte solution for a sodium secondary battery. A sodium secondary battery using a nonaqueous electrolyte solution including $NaPF_6$ and propylene carbonate is reported and examples of the nonaqueous solvent include cyclic sulfones and cyclic sulfonic esters. However, no specific description is given of cells using these solvents (Patent Citation 1).

PRIOR ART DOCUMENT

Patent Citation

[Patent Citation 1] Japanese Published Patent Application No. 2014-112538

SUMMARY OF THE INVENTION

Problem to be Solved by the Invention

The sodium secondary battery using the above-described electrolyte solution has been required to have higher charge-discharge cycle characteristics in some cases. An object of the present invention is to provide an electrolyte solution for a sodium secondary battery which has excellent charge-discharge cycle characteristics and the sodium secondary battery.

Means for Solving the Problem

In order to achieve the aforementioned object, there is provided a nonaqueous electrolyte solution for a sodium secondary battery including a sodium salt, a compound having a sulfur-oxygen bond, and a nonaqueous solvent, in which an amount of the compound having the sulfur-oxygen bond is in a rage of 0.05% by weight or more and 10% by weight or less with respect to the nonaqueous electrolyte solution.

MODE FOR CARRYING OUT THE INVENTION

<Nonaqueous Electrolyte Solution>
The nonaqueous electrolyte solution for the sodium secondary battery according to the present invention includes a sodium salt, the compound having the sulfur-oxygen bond, and nonaqueous solvent, in which an amount of the compound having the sulfur-oxygen bond is in a rage of 0.05% by weight or more and 10% by weight or less with respect to the nonaqueous electrolyte solution.

The nonaqueous electrolyte solution may be in a solution state (sol state), or may be in a gel state with poor fluidity. Also, both of the sol state and the gel state may coexist. The gel is at least one selected from the group consisting of a chemically-crosslinked gel and a physically-crosslinked gel.

<Sodium Salt>
Examples of the sodium salt used in the nonaqueous electrolyte solution include $NaPF_6$, $NaBF_4$, $NaClO_4$, $Na(FSO_2)_2N$, $Na(CF_3SO_2)_2N$, $Na(C_2F_5SO_2)_2N$, $NaCF_3SO_3$, $NaAsF_6$, $NaSbF_6$, $NaBC_4O_8$, a lower aliphatic carboxylic acid sodium salt, $NaAlCl_4$, $NaPO_2F_2$, and $Na_2PO_3F$ are given and two or more of these may be mixed to be used. Among these, at least one selected from the group consisting of $NaPF_6$, $NaBF_4$, $NaSbF_6$, $Na(FSO_2)_2N$, $Na(CF_3SO_2)_2N$, $Na(C_2F_5SO_2)_2N$, $NaCF_3SO_3$, and $Na_2PO_3F$, which are the sodium salt including fluorine, is preferably used. More preferably, at least one selected from the group consisting of $NaPF_6$, $NaBF_4$, $Na(FSO_2)_2N$, and $Na(CF_3SO_2)_2N$ is used.

The sodium salt in the nonaqueous electrolyte solution may partly remain undissolved, or entirely dissolved. In view of conductivity, the sodium salt in the nonaqueous electrolyte solution is contained in a ratio of preferably 0.5 mol or more, more preferably 0.7 mol or more, further preferably 0.8 mol or more with respect to 1 L of the nonaqueous electrolyte solution. In view of the dissolubility of the sodium salt in the nonaqueous electrolyte solution, the sodium salt is contained in a ratio of preferably 3.0 mol or less, more preferably 2.5 mol or less, further preferably 2.0 mol or less, particularly preferably 1.5 mol or less with respect to 1 L of the nonaqueous electrolyte solution.

<Nonaqueous Solvent>
In the present invention, examples of the nonaqueous solvent that can be used in the nonaqueous electrolyte solution include cyclic carbonic esters such as propylene carbonate, ethylene carbonate, fluoroethylene carbonate, difluoroethylene carbonate, and vinylene carbonate; chain carbonic esters such as dimethyl carbonate, diethyl carbonate, and ethylmethyl carbonate; ethers such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters such as methyl formate and methyl acetate; lactones such as γ-butyrolactone, γ-valerolactone, δ-valerolactone, and ε-caprolactone; nitriles such as acetonitrile and butyronitrile; amides such as N,N-dimethylformamide, N,N-dimethylacetamide, N-methyl-2-pyrrolidone and 1,3-dimethyl-2-imidazolidinone; carbamates such as 3-methyl-2-oxazolidone. As a nonaqueous solvent, two or more of these may be mixed and used.

The nonaqueous solvent used in the nonaqueous electrolyte solution preferably contains at least one selected from the group consisting of ethylene carbonate, fluoroethylene carbonate, propylene carbonate, and γ-butyrolactone, more preferably contains ethylene carbonate and/or propylene carbonate, and further preferably contains propylene carbonate.

Ethylene carbonate, fluoroethylene carbonate, propylene carbonate, and γ-butyrolactone are highly dielectric nonaqueous solvents. Solubility of the compound having the sulfur-oxygen bond which is included in the nonaqueous electrolyte solution is improved by using the highly dielectric nonaqueous solvent. From the viewpoint of the solubility of the compound having the sulfur-oxygen bond, the highly dielectric nonaqueous solvent is preferably 40% by weight or more, more preferably 50% by weight or more, further preferably 60% by weight or more, particularly preferably 70% by weight or more with respect to the nonaqueous electrolyte solution. Also, from the view point of the wettability of the nonaqueous electrolyte solution to the separator, the highly dielectric nonaqueous solvent is preferably 90% by weight or less with respect to the nonaqueous electrolyte solution.

<Compound Having a Sulfur-Oxygen Bond>

Examples of the compound having the sulfur-oxygen bond according to the present invention may include a sulfonic acid ester compound and a sulfoxide compound. The compound having —(S=O)— bond which is included in the nonaqueous electrolyte solution is preferably at least one selected from the group consisting of a compound represented by formula (A), a compound represented by formula (B), a compound represented by formula (C), and a compound represented by formula (D) as shown below.

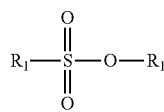

Formula (A)

(In the formula, $R_1$ represents an optionally substituted alkyl group having 1 to 20 carbon atoms or an optionally substituted aryl group having 6 to 20 carbon atoms. Multiple $R_1$s may be the same or different from each other.)

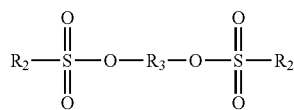

Formula (B)

(In the formula, $R_2$ represents an optionally substituted alkyl group having 1 to 20 carbon atoms or an optionally substituted aryl group having 6 to 20 carbon atoms. $R_3$ represents an optionally substituted alkylene group having 1 to 10 carbon atoms. Multiple $R_2$s may be the same or different from each other.)

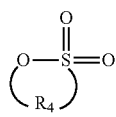

Formula (C)

(In the formula, $R_4$ represents an optionally substituted alkylene group having 2 to 10 carbon atoms.)

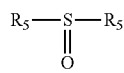

Formula (D)

(In the formula, $R_5$ represents an optionally substituted alkyl group having 1 to 20 carbon atoms or an optionally substituted aryl group having 6 to 20 carbon atoms. Multiple $R_5$s may be the same or different from each other.)

As the alkyl group having 1 to 20 carbon atoms represented by $R_1$ in formula (A), for example, a methyl group, an ethyl group, a propyl group, an isopropyl group, a butyl group, an isobutyl group, a sec-butyl group, a tert-butyl group, a pentyl group, a 2,2-dimethylpropyl group, a cyclopentyl group, a hexyl group, a cyclohexyl group, a heptyl group, a 2-methylpentyl group, an octyl group, a 2-ethylhexyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group and the like are given.

As a substituent that may be possessed by the alkyl group having 1 to 20 carbon atoms represented by $R_1$ in formula (A), for example, at least one substituent selected from the group consisting of fluorine atom, chlorine atom, bromine atom, iodine atom, an alkoxy group having 1 to 20 carbon atoms, an aryl group having 6 to 20 carbon atoms, an aryloxy group having 6 to 20 carbon atoms, an acyl group having 2 to 20 carbon atoms, an arylsulfonyl group having 6 to 20 carbon atoms, and cyano group is given.

As the aryl group having 6 to 20 carbon atoms represented by $R_1$ in formula (A), for example, a phenyl group, a 1-naphtyl group, a 2-naphtyl group, a phenanthryl group, an anthryl group and the like are given.

As a substituent that may be possessed by the aryl group having 6 to 20 carbon atoms represented by $R_1$ in formula (A), for example, at least one substituent selected from the group consisting of fluorine atom, chlorine atom, bromine atom, iodine atom, an alkyl group having 1 to 20 carbon group, an alkoxy group having 1 to 20 carbon atoms, an aryl group having 6 to 20 carbon atoms, an aryloxy group having 6 to 20 carbon atoms, an acyl group having 2 to 20 carbon atoms, an arylsulfonyl group having 6 to 20 carbon atoms is given.

Examples of the compound having the sulfur-oxygen bond represented by formula (A) include methyl methanesulfonate, ethyl methanesulfonate, propyl methanesulfonate, isopropyl methanesulfonate, phenyl methanesulfonate, methyl ethanesulfonate, ethyl ethanesulfonate, propyl ethanesulfonate, isoprolyl ethanesulfonate, phenyl ethanesulfonate, methyl benzenesulfonate, ethyl benzenesulfonate, propyl benzenesulfonate, isopropyl benzenesulfonate, phenyl benzenesulfonate, methyl p-toluenesulfonate, ethyl p-toluenesulfonate, propyl p-toluenesulfonate, isopropyl p-toluenesulfonate, phenyl p-toluenesulfonate, methyl trifluoromethanesulfonate, ethyl trifluoromethanesulfonate, propyl trifluoromethanesulfonate, isopropyl trifluoromethanesulfonate, phenyl trifluoromethanesulfonate, methyl 4-fluorobenzenesulfonate, ethyl 4-fluorobenzenesulfonate, propyl 4-fluorobenzenesulfonate, isopropyl 4-fluorobenzenesulfonate, phenyl 4-fluorobenzenesulfonate methyl 2-trifluoromethylbenzenesulfonate, ethyl 2-trifluoromethylbenzenesulfonate, propyl 42-trifluoromethylbenzenesulfonate, isoproyl 2-trifluoromethylbenzenesulfonate, pheyl 2-trifluoromethylbenzenesulfonate, and the like.

Examples of the alkyl group having 1 to 20 carbon atoms or the aryl group having 6 to 20 carbon atoms represented by $R_2$ in formula (B) are similar to the alkyl group having 1 to 20 carbon atoms or the aryl group having 6 to 20 carbon atoms represented by $R_1$ in formula (A), respectively. The alkyl group having 1 to 20 carbon atoms or the aryl group having 6 to 20 carbon atoms represented by $R_2$ may have a substituent similar to $R_1$ in formula (A). Examples of a substituent that may be possessed by the alkyl group having 1 to 20 carbon atoms or the aryl group having 6 to 20 carbon atoms represented by $R_2$ are similar to the substituent that may be possessed by the alkyl group having 1 to 20 carbon atoms or the aryl group having 6 to 20 carbon atoms represented by $R_1$ in formula (A), respectively. An alkyl group having 1 to 20 carbon atoms that may be possessed by the aryl group having 6 to 20 carbon atoms represented by $R_2$ may be substituted with a fluorine atom. Multiple $R_2$s may be the same or different from each other. As the group represented by $R_2$ in formula (B), the aryl group having 6 to 20 carbon atoms is preferable and the aryl group having 6 to 20 carbon atoms substituted with $CF_3$ is more preferable.

Examples of the alkylene group having 1 to 10 carbon atoms represented by $R_3$ in formula (B) include a methylene group, an ethylene group, an propylene group, an butylene group, a pentylene group, 2,2-dimethylpropylene group, a hexylene group, a heptylene group, an octylene group, a nonylene group, a decylene group and the like. The methylene group and the ethylene group are preferable among these and the methylene group is more preferable.

Examples of a substituent that may be possessed by the alkylene group having 1 to 10 carbon atoms represented by $R_3$ in formula (B) include at least one substituent selected from the group consisting of fluorine atom, chlorine atom, bromine atom, iodine atom, an alkoxy group having 1 to 20 carbon atoms, an aryl group having 6 to 20 carbon atoms, an aryloxy group having 6 to 20 carbon atoms, an acyl group having 2 to 20 carbon atoms, an arylsulfonyl group having 6 to 20 carbon atoms, and cyano group.

Examples of the compound having the sulfur-oxygen bond represented by formula (B) include methylene bis(methanesulfonate), methylene bismethanesulfonate), methylene bis(trifluoromethanesulfonate), ethylene bis(methanesulfonate), ethylene bismethanesulfonate), ethylene bis(trifluoromethanesulfonate) and the like.

The compound having the sulfur-oxygen bond represented by formula (B) is preferably a compound represented by the following formula (E).

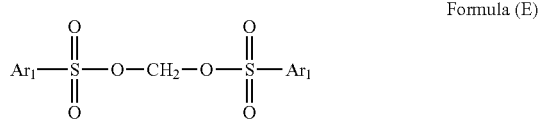

Formula (E)

(In the formula, $Ar_1$ represents an optionally substituted aryl group having 6 to 20 carbon atoms. Multiple $Ar_1$s may be the same or different from each other.)

Examples of the aryl group having 6 to 20 carbon atoms represented by $Ar_1$ in formula (E) are similar to the aryl group having 6 to 20 carbon atoms represented by $R_2$.

Examples of a substituent that may be possessed by the aryl group having 6 to 20 carbon atoms represented by $Ar_1$ in formula (E) include at least one substituent selected from the group consisting of fluorine atom, chlorine atom, bromine atom, iodine atom, an alkyl group having 1 to 20 carbon atoms, an alkoxy group having 1 to 20 carbon atoms, an aryl group having 6 to 20 carbon atoms, an aryloxy group having 6 to 20 carbon atoms, an acyl group having 2 to 20 carbon atoms, an arylsulfonyl group having 6 to 20 carbon atoms, and cyano group. The alkyl group having 1 to 20 carbon atoms that may be possessed by the aryl group having 6 to 20 carbon atoms represented by $Ar_1$ may be substituted with fluorine atom.

A substituent represented by $Ar_1$ in formula (E) is preferably the aryl group having 6 to 20 carbon atoms and more preferably an aryl group having 6 to 20 carbon atoms substituted with $CF_3$.

Examples of the compound having the sulfur-oxygen bond represented by formula (E) include methylene bis(benzenesulfonate), methylene bis(4-fluorobenzenesulfonate), methylene bis(pentafluorobenzenesulfonate), methylene bis(4-methylbenzenesulfonate), methylene bis(2,4,6-trifluoromethylbenzenesulfonate), methylene bis(4-trifluoromethylbenzenesulfonate), methylene bis(4-methoxybenzenesulfonate), methylene bis(2,4,6-trimethylbenzenesulfonate), methylene bis(1-naphthalenesulfonate), methylene bis(2-naphthalenesulfonate), and the like.

Examples of the alkylene group having 2 to 10 carbon atoms represented by $R_4$ in formula (C) include an ethylene group, a propane-1,3-diyl group, a propene-1,3-diyl group, a butane-1,3-diyl group, a butane-1,4-diyl group, pentylene group, a 2,2-dimethylpropylene group, a hexylene group, a heptylene group, an octylene group, a nonylene group, a decylene group and the like. The a propane-1,3-diyl group, the propene-1,3-diyl group, the butane-1,3-diyl group, and the butane-1,4-diyl group are preferable among these.

Examples of a substituent that may be possessed by the alkylene group having 2 to 10 carbon atoms represented by $R_4$ in formula (C) include at least one substituent selected from the group consisting of fluorine atom, chlorine atom, bromine atom, iodine atom, an alkoxy group having 1 to 20 carbon atoms, an aryl group having 6 to 20 carbon atoms, an aryloxy group having 6 to 20 carbon atoms, an acyl group having 2 to 20 carbon atoms, an arylsulfonyl group having 6 to 20 carbon atoms, and cyano group.

Examples of the compound having the sulfur-oxygen bond represented by formula (C) include 1,3-propanesultone, 1,3-propenesultone, 1,3-butaneslutone, 1,4-butaneslutone, 2-fluoro-1,3-propanesultone, perfluoro-1,3-propaneslutone and the like.

Examples of the alkyl group having 1 to 20 carbon atoms or the aryl group having 6 to 20 carbon atoms represented by $R_5$ in formula (D) are similar to the alkyl group having 1 to 20 carbon atoms or the aryl group having 6 to 20 carbon atoms represented by $R_1$ in formula (A), respectively. The alkyl group having 1 to 20 carbon atoms or the aryl group having 6 to 20 carbon atoms represented by $R_5$ may have a substituent similar to $R_1$ in formula (A). Examples of a substituent that may be possessed by the alkyl group having 1 to 20 carbon atoms or the aryl group having 6 to 20 carbon atoms represented by $R_5$ in formula (D) are the same as the substituent that may be possessed by the alkyl group having 1 to 20 carbon atoms or the aryl group having 6 to 20 carbon atoms represented by $R_1$ in formula (A), respectively. Multiple $R_5$s may be the same or different from each other.

Examples of the compound having the sulfur-oxygen bond represented by formula (D) include dimethyl sulfoxide, ethyl methyl sulfoxide, diethyl sulfoxide and the like.

As the nonaqueous electrolyte solution is used, it is considered that a coat is formed on a surface of a positive electrode and/or a negative electrode and a charge-discharge cycle characteristic is efficiently improved.

The compound having the sulfur-oxygen bond which is included in the nonaqueous electrolyte solution according to the present invention may be used alone or in combination of two or more. A content of the compound having the sulfur-oxygen bond in the nonaqueous electrolyte solution is 10% by weight or less with respect to the total weight of the nonaqueous electrolyte solution. The content of the compound having the sulfur-oxygen bond is preferably 5% by weight or less, more preferably 3% by weight or less, even more preferably 2% by weight or less, and further preferably 1% by weight or less. The content of the compound having the sulfur-oxygen bond is 0.05% by weight or more with respect to the total weight of the nonaqueous electrolyte solution. From the point of view of improving the charge-discharge cycle characteristic, the content of the compound having the sulfur-oxygen bond is preferably 0.08% by weight or more, more preferably 0.1% by weight or more, even more preferably 0.2% by weight or more, and further preferably 0.5% by weight or more.

<Method for Preparing Nonaqueous Electrolyte Solution>

The nonaqueous electrolyte solution used in the present invention is obtained by adding, stirring and dissolving the nonaqueous solvent, the sodium salt and the compound having the sulfur-oxygen bond. In the dissolving step, the nonaqueous electrolyte solution may be heated as is necessary.

For the purpose of improving the wettability with a separator, one or two or more surfactants such as trioctyl phosphate, diphenylether, ethyl octanoate, and polyoxyethylene ethers having a perfluoroalkyl group may be added to the nonaqueous electrolyte solution. The adding amount of the surfactant is preferably 5% by weight or less, more preferably 0.01 to 3% by weight with respect to the total weight of the electrolyte solution.

<Sodium Secondary Battery>

The sodium secondary battery according to the present invention includes a positive electrode including a sodium-containing compound which is capable of being doped and undoped with sodium ions as a positive electrode active material, a negative electrode including a negative electrode active material which is capable of being doped and undoped with sodium ions, and the nonaqueous electrolyte solution. Generally, the sodium secondary battery further includes a separator.

The sodium secondary battery can be usually produced by storing a laminate of a negative electrode, a separator, and positive electrode or an electrode group obtained by winding or folding the laminate in a battery can or an aluminum laminate pack and immersing the electrode group in the nonaqueous electrolyte solution.

A shape of the electrode group includes, for example, a shape such that the cross section when the electrode group is cut in the direction perpendicular to the axis of the winding has a circle, an ellipse, a rectangular shape, or a rectangular shape without sharp edges. Examples of the shape of the battery include a paper shape, a coin shape, a cylindrical shape, and a rectangular prism shape.

In particular, in the case of a paper-shaped battery or in a rectangular prism-shaped battery using an aluminum laminate pack, a pressing process such as pressing is occasionally conducted in the direction perpendicular to the electrode surface after production from the viewpoint of fixing a shape.

<Positive Electrode>

In the sodium secondary battery of the present invention, the positive electrode includes sodium-containing compound which is capable of being doped and undoped with sodium ions as the positive electrode active material. The positive electrode may be made up of a collector and a positive electrode mixture containing the positive electrode active material carried on the collector. The positive electrode mixture contains a conductive material and a binder as is necessary besides the positive electrode active material.

<Positive Electrode Active Material>

In the sodium secondary battery of the present invention, the positive electrode active material is formed of a sodium-containing transition metal compound. The sodium-containing transition metal compound is capable of being doped and undoped with sodium ions.

As the sodium-containing transition metal compound, the following compounds can be recited.

That is, oxides represented by $NaM^3_{a1}O_2$ such as $NaFeO_2$, $NaMnO_2$, $NaNiO_2$, $NaCoO_2$, $NaMn_{0.5}Ni_{0.5}O_2$, $NaFe_{0.5}Ni_{0.5}O_2$, $NaFe_{1/3}Mn_{1/3}Ni_{1/3}O_2$, and $NaFe_{0.4}Mn_{0.3}Ni_{0.3}O_2$; oxides represented by $Na_{0.44}Mn_{1-a2}M^3_{a2}O_2$, oxides represented by $Na_{0.7}Mn_{1-a2}M^3_{a2}O_{2.05}$ ($M^3$ represents at least one transition metal element, $0<a1<1$, $0 \leq a2<1$);

oxides represented by $Na_{b1}M^4_cSi_{12}O_{30}$ ($M^4$ represents at least one transition metal element, $2 \leq b1 \leq 6$, $2 \leq c \leq 5$) such as $Na_6Fe_2Si_{12}O_{30}$ and $Na_2Fe_5Si_{12}O_{30}$;

oxides represented by $Na_dM^5_eSi_6O_{18}$ ($M^5$ represents at least one transition metal element, $2 \leq d \leq 6$, $1 \leq e \leq 2$) such as $Na_2Fe_2Si_6O_{18}$ and $Na_2MnFeSi_6O_{18}$;

oxides represented by $Na_fM^6_gSi_2O_6$ ($M^6$ represents at least one element selected from the group consisting of a transition metal element, Mg and Al, $1 \leq f \leq 2$, $1 \leq g \leq 2$) such as $Na_2FeSiO_6$;

phosphates such as $NaFePO_4$, $NaMnPO_4$, $Na_3Fe_2(PO_4)_3$, $Na_3V_2(PO_4)_2F_3$, $Na_{1.5}VOPO_4F_{0.5}$, $Na_4Fe_3(PO_4)_2P_2O_7$, $Na_4Mn_3(PO_4)_2P_2O_7$, $Na_4Ni_3(PO_4)_2P_2O_7$, and $Na_4Co_3(PO_4)_2P_2O_7$;

fluorophosphates such as $Na_2FePO_4F$, $Na_2VPO_4F$, $Na_2MnPO_4F$, $Na_2CoPO_4F$, and $Na_2NiPO_4F$;

fluorosulfates such as $NaFeSO_4F$, $NaMnSO_4F$, $NaCoSO_4F$, and $NaFeSO_4F$;

borates such as $NaFeBO_4$ and $Na_3Fe_2(BO_4)_3$; and fluorides represented by $Na_hM^7F_6$ ($M^7$ represents at least one transition metal element, $2 \leq h \leq 3$) such as $Na_3FeF_6$, $Na_2MnF_6$; can be recited.

In the present invention, as the positive electrode active material, a composite metal oxide represented by the following formula (I) can be preferably used among the sodium-containing transition metal compound. With using the composite metal oxide represented by the following formula (I) as the positive electrode active material, it is possible to improve the charge/discharge capacity of the cell.

$$Na_aM^1_bM^2O_2 \qquad (I)$$

($M^1$ represents at least one element selected from the group consisting of Mg, Ca, Sr, and Ba, $M^2$ represents at least one element selected from the group consisting of Mn, Fe, Co, Cr, V, Ti, and Ni, a is a value in the range of 0.5 or more and 1.05 or less, b is a value in the range of 0 or more and 0.5 or less, and a+b is a value in the range of 0.5 or more and 1.10 or less.)

<Conductive Material>

As the conductive material, a carbon material can be used. Examples of the carbon material include graphite powder, carbon black (e.g., acetylene black, Ketjen black, Furnace black, etc.), fibrous carbon materials (carbon nanotube, carbon nanofiber, vapor phase grown carbon fiber, etc.) and the like. The carbon materials have the large surface area. When they are added in a small amount into the electrode mixture, it is possible to improve the conductivity inside the obtained electrode, the charge/discharge efficiency, and the heavy-current discharge characteristics. Generally, the proportion of the conductive material in the positive electrode mixture is 4 to 20 parts by weight with respect to 100 parts by weight of the positive electrode active material and two or more kinds of the conductive material may be contained.

<Binder>

Examples of the binder used in the positive electrode mixture include polymers of fluorine compounds and addition polymers of monomers having an ethylenic double bond not containing a fluorine atom.

A glass transition temperature of the binder is preferably −50 to 25° C. By setting the glass transition temperature within the above-described range, it is possible to improve a flexibility of the obtained positive electrode, and to obtain a sodium secondary battery that is sufficiently usable under a low temperature environment.

Preferred examples of the binder used in the positive electrode mixture include fluorine resins such as polytetrafluoroethylene, polychlorotrifluoroethylene, tetrafluoroethylene-perfluoroalkylvinyl ether copolymer, ethylene-tetrafluoroethylene copolymer, ethylene-chlorotrifluoroethylene copolymer, and tetrafluoroethylene-hexafluoropropylene copolymer, fluorine rubbers such as vinylidene fluoride-hexafluoropropylene copolymer, vinylidene fluoride-tetrafluoroethylene copolymer, vinylidene fluoride-hexafluoropropylene-tetrafluoroethylene copolymer, vinylidene fluoride-pentafluoropropylene copolymer, vinylidene fluoride-pentafluoropropylene-tetrafluoroethylene copolymer, vinylidene fluoride-perfluoromethylvinyl ether-tetrafluoroethylene copolymer, and vinylidene fluoride-chlorotrifluoroethylene copolymer;

acrylic polymers such as polyacrylic acid, polyacrylic alkali salts (sodium polyacrylate, potassium polyacrylate, lithium polyacrylate, etc.), alkyl polyacrylate (the number of carbons in the alkyl moiety is 1 to 20), acrylic acid-alkyl acrylate (the number of carbons in the alkyl moiety is 1 to 20) copolymer, polyacrylonitrile, acrylic acid-alkyl acrylate-acrylonitrile copolymer, polyacrylamide, acrylonitrile-butadiene copolymer, and acrylonitrile-butadiene copolymer hydride;

methacrylic polymers such as polymethacrylic acid, alkyl polymethacrylate (the number of carbons in the alkyl moiety of the alkyl group is 1 to 20), and methacrylic acid-alkyl methacrylate copolymer;

polyether polymers such as polyethylene oxide, polypropylene glycol, polytetramethylene oxide, polyether sulfone, ethylene oxide-propylene oxide copolymer, and ethylene oxide-alkylene oxide copolymer;

olefinic polymers such as polyvinyl alcohol (partially saponificated or completely saponificated), ethylene-vinyl alcohol copolymer, polyvinylpyrrolidone, ethylene-vinyl acetate copolymer, ethylene-vinyl acetate-alkyl acrylate (the number of carbons in the alkyl moiety of the alkyl group is 1 to 20) copolymer, ethylene-methacrylic acid copolymer, ethylene-acrylic acid copolymer, ethylene-alkyl methacrylate copolymer, ethylene-alkyl acrylate copolymer, and ethylene-acrylonitrile copolymer; and styrene-containing polymers such as acrylonitrile-styrene-butadiene copolymer, styrene-acrylonitrile copolymer, styrene-butadiene copolymer, and styrene-butadiene copolymer hydride.

In particular, it is preferable to use a copolymer having a structural unit derived from vinylidene halide since an electrode having high density of the positive electrode mixture is easily obtained and the volume energy density of the battery is improved.

A mixing proportion of the binder in the positive electrode mixture is generally 0.5 to 15 parts by weight, preferably 2 to 10 parts by weight with respect to 100 parts by weight of the positive electrode mixture.

<Method for Producing Positive Electrode>

A positive electrode is produced, for example, by carrying a positive electrode mixture containing a positive electrode active material which is capable of being doped and undoped with sodium ions on a positive electrode collector. As a method for carrying the positive electrode mixture on the positive electrode collector, for example, a method of forming a positive electrode mixture paste by kneading a positive electrode active material, a conductive material, a binder, and a solvent and applying the obtained positive electrode mixture paste on a collector, followed by drying can be given. The method for applying the positive electrode mixture paste on the collector is not particularly limited. As examples, a slit die coating method, a screen coating method, a curtain coating method, a knife coating method, a gravure coating method, an electrostatic spray method and the like can be given. As drying conducted after the application, a heat treatment may be employed or air-blow drying, vacuum drying or the like may be employed. When drying by a heat treatment is employed, the temperature is generally about 50 to 150° C. Also, a press may be conducted after drying. As a method for the press, a die press, a roll press and the like can be given. With the methods as described above, it is possible to produce the electrode. The thickness of the positive electrode mixture is generally about 5 to 500 μm.

As an example of the solvent used in the positive electrode mixture paste, organic solvents can be given. The organic solvent may be any of a polar solvent or a nonpolar solvent. Examples of the polar solvent include amides such as N-methyl-2-pyrrolidone, N,N-dimethylacetamide, and N,N-dimethylformamide; alcohols such as isopropyl alcohol, ethanol, and methanol; ethers such as propylene glycol dimethylether; and ketones such as acetone, methylethyl ketone, and methylisobutyl ketone. Examples of the nonpolar solvent include hexane, toluene and the like. Also as a solvent, water may be used, and water is preferred for reducing the production cost of the electrode.

The proportion of the positive electrode mixture ingredient in the positive electrode mixture paste, namely, the proportion of the sum of the positive electrode active material, the conductive material, and the binder in the positive electrode mixture paste is generally 40 to 70% by weight from the viewpoint of the thickness of the obtained electrode and the coating performance.

In the positive electrode, as an example of the collector, a conductor such as Al, Al alloy, Ni or stainless can be given, and Al is preferred since it is easily processed into a thin film and is low in price. Examples of the shape of the collector include a foil shape, a plate shape, a mesh shape, a net shape, a lath shape, a punching metal shape, an embossed shaped, and combinations thereof (for example, meshed plate). Unevenness may be formed on the surface of the collector by etching.

<Method for Producing Positive Electrode Active Material>

A sodium-containing transition metal oxide, which is one of examples of the positive electrode active material, can be produced by firing a mixture of a metal-containing compound having such a composition that can become the sodium-containing transition metal oxide used in the present invention by firing. Specifically, it can be produced by weighing and mixing the metal-containing compound containing corresponding metal elements to have a predetermined composition and then firing the obtained mixture. For example, a sodium-containing transition metal oxide having a metal element ratio represented by Na:Mn:Fe:Ni=1:0.3:0.4:0.3, which is one of preferred metal element ratios, can be produced by weighing the respective materials of $Na_2CO_3$, $MnO_2$, $Fe_3O_4$, and $Ni_2O_3$ so that the molar ratio of Na:Mn:Fe:Ni is 1:0.3:0.4:0.3, mixing the weighed materials, and firing the obtained mixture. When the sodium-containing transition metal oxide contains $M^1$ ($M^1$ has the same meaning as described above), a material containing $M^1$ can be added at the time of mixing.

Examples of the metal-containing compound that can be used for producing the sodium-containing transition metal compound used in the present invention include oxides and compounds that can become oxides when they are decomposed at high temperature and/or oxidized, for example, hydroxides, carbonates, nitrates, halides or oxalates. As examples of the sodium compound, at least one compound selected from the group consisting of sodium hydroxide, sodium chloride, sodium nitrate, sodium peroxide, sodium sulfate, sodium bicarbonate, sodium oxalate and sodium carbonate can be given and also hydrates of these compounds can be given. From the view point of the handleability, sodium carbonate is more preferred. As a manganese compound, $MnO_2$ is preferred, as an iron compound, $Fe_3O_4$ is preferred, and as a nickel compound, $Ni_2O_3$ is preferred. These metal-containing compounds may be hydrates.

A mixture of the metal-containing compound can be obtained by obtaining a precursor of the metal-containing compound, for example, by the following precipitation method and mixing the obtained precursor of the metal-containing compound with the sodium compound.

Specifically, as a material of $M^2$ (here, $M^2$ has the same meaning as described above), a compound such as a chloride, a nitrate, an acetate, a formate, or an oxalate is used. The compound is dissolved in water and brought into contact with a precipitator and thus a precipitate containing the precursor of the metal-containing compound can be obtained. Among these materials, chlorides are preferred. Further, when a material that is difficult to be dissolved in water is used, for example, when an oxide, a hydroxide, or a metal material is used as a material, these materials may be dissolved in acid such as hydrochloric acid, sulfuric acid, or nitric acid, or aqueous solutions thereof and an aqueous solution containing $M^2$ may be obtained.

As the precipitator, at least one compound selected from the group consisting of lithium hydroxide, sodium hydroxide, potassium hydroxide, lithium carbonate, sodium carbonate, potassium carbonate, ammonium carbonate and urea can be used. As the precipitator, at least one hydrate of these compounds may be used. As the precipitator, the compound and the hydrate may be used together. Preferably, the precipitator is dissolved in water and used in the form of an aqueous solution. The concentration of the precipitator in the aqueous solution is about 0.5 to 10 mol/L, preferably about 1 to 8 mol/L. Also, it is preferred to use potassium hydroxide as the precipitator, and more preferably, a potassium hydroxide aqueous solution in which potassium hydroxide is dissolved in water is used. As the precipitator in the form of an aqueous solution, aqueous ammonia can be also given and the aqueous ammonia and the aqueous solution of the above-described compound may be used together.

As an example of a method for bringing the aqueous solution containing $M^2$ into contact with the precipitator, a method of adding the precipitator or the precipitator in the form of an aqueous solution to the aqueous solution containing $M^2$, a method of adding the aqueous solution containing $M^2$ to the precipitator in the form of an aqueous solution, and a method of adding the aqueous solution containing $M^2$ and one of the precipitator and the precipitator in the form of an aqueous solution to water can be given. Addition of these is preferably accompanied by stirring. Among the aforementioned methods for contacting, a method of adding the aqueous solution containing $M^2$ to the precipitator in the form of an aqueous solution is preferable since pH is easily kept constant and the grain size can be easily controlled. In this case, the pH tends to be lowered as the aqueous solution containing $M^2$ is added to the precipitator in the form of an aqueous solution. It is desired to add the aqueous solution containing $M^2$ while pH is adjusted to be 9 or more, preferably 10 or more. This adjustment can also be achieved by addition of the precipitator in the form of an aqueous solution.

By the contact as described above, it is possible to obtain the precipitate. The precipitate contains a precursor of the metal-containing compound.

Also, after the contact between the aqueous solution containing $M^2$ and the precipitator, generally, slurry is formed, and the slurry can be separated into solid and liquid, and the precipitate can be collected. The solid-liquid separation may be conducted in any method, however, from the view point of the handleability, a method based on solid-liquid separation such as filtration is preferably employed or alternatively a method of volatilizing the liquid by heating such as spray drying may be used. The collected precipitate may be washed or dried. Since the ingredient of the excess precipitator sometimes adheres to the precipitate obtained after solid-liquid separation, it is possible to reduce the ingredient by washing. As a washing liquid used in washing, water is preferably used and a water-soluble organic solvent such as alcohol or acetone may be used. The drying can be conducted by heat drying or may be conducted by air-blow drying, vacuum drying, or the like. When the drying is conducted by heat drying, the drying is conducted generally at 50 to 300° C., preferably at about 100 to 200° C. The washing may be conducted two or more times.

While the mixing of the sodium compound and the precursor of the metal-containing compound can be conducted by any of dry mixing and wet mixing, dry mixing is preferred from the view point of convenience. As an example of the mixing device, stirring mixer, a V-type mixer, a W-type mixer, a ribbon mixer, a drum mixer and a ball mill can be given. Firing can be conducted at a temperature, which depends on the kind of the used sodium compound, generally in the range of from about 400 to 1200° C., preferably at a temperature in the range of from about 500 to 1000° C. The time retained at the temperature is generally 0.1 to 20 hours, preferably 0.5 to 10 hours. The raising speed of temperature to the retained temperature is generally 50 to 400° C./hour and the dropping speed of temperature to the room temperature from the retained temperature is generally 10 to 400° C./hour. As an atmosphere for firing, atmospheric air, oxygen, nitrogen, argon or mixed gas thereof can be used, and atmospheric air is preferred.

By using an appropriate amount of a halide or the like such as a fluoride or a chloride as the metal-containing compound, it is possible to control a crystallinity of the generated composite metal oxide and the average particle diameter of particles constituting the composite metal oxide. In this case, the halide can occasionally function as a reaction promotor (flux). Examples of the flux include NaF, $MnF_3$, $FeF_2$, $NiF_2$, $CoF_2$, NaCl, $MnCl_2$, $FeCl_2$, $FeCl_3$, $NiCl_2$, $CoCl_2$, $NH_4Cl$ and $NH_4I$. These can be used as a material for the mixture (metal-containing compound) or by being added to the mixture in an appropriate amount. These fluxes may be hydrates. Other examples of the metal-containing compound include $Na_2CO_3$, $NaHCO_3B_2O_3$ and $H_3BO_3$.

When the sodium-containing transition metal compound used in the present invention is used as the positive electrode active material for the sodium secondary battery, it is preferred to grind the sodium-containing transition metal compound obtained in the manner as described above by using a device that is commonly and industrially used such as a ball mill, a jet mill, and a vibrating mill and conduct washing, classification, and the like in order to adjust the grain size. Firing may be conducted two or more times. Also a surface treatment may be conducted so as to coat the grain surface of the sodium-containing transition metal compound with an inorganic substance containing Si, Al, Ti, Y or the like.

<Negative Electrode>

As the negative electrode that can be used in the sodium secondary battery of the present invention, an electrode in which a negative electrode mixture containing a negative electrode active material is carried on a negative electrode collector or a sodium metal or sodium alloy electrode which is capable of being doped or undoped with sodium ions can be used. As an example of the negative electrode active material, besides the sodium metal or sodium alloy, carbon materials such as natural graphite or artificial graphite whose phase gap is wide, cokes, carbon black, pyrocarbons, carbon fiber, and fired organic polymer compounds and metal that are capable of being doped or undoped with sodium ions can be given. A shape of the carbon material may be any of flakes represented by natural graphite whose phase gap is wide, spheres represented by meso-carbon microbeads, fibers represented by graphitized carbon fibers, and an aggregate of fine powder. Here, the carbon material may function as a conductive material.

As examples of a carbon material, nongraphitized carbon materials such as carbon black, pyrocarbons, carbon fiber, and fired organic materials (hereinafter, also referred to as hard carbon) can be given. As the hard carbon, a hard carbon with an interlayer distance d (002) by the X-ray diffraction method of 0.360 nm or more and 0.395 nm or less and a size Lc of the crystalline in a c-axis direction of 1.30 nm or less is preferred. Also, a hard carbon with an R value (ID/IG) calculated from the results of Raman spectroscopy of 1.07 or more and 3 or less is preferred. Here, R value (ID/IG) is obtained as follows. Raman spectrum obtained by conducting Raman spectrometry by irradiating with a laser beam having a wavelength of 532 nm (the vertical axis indicates scattered light intensity of an arbitrary unit and the horizontal axis indicates a Raman shift wave number ($cm^{-1}$)) has each peak in a range of 1300 to 1400 $cm^{-1}$ of the horizontal axis and 1570 to 1620 $cm^{-1}$ of the horizontal axis, respectively. A fitting function is obtained by conducting a fitting the spectrum in the range of a wave number range of 600 to 1740 $cm^{-1}$ using two Lorentz functions and one baseline function. A fitting spectrum is obtained by removing the base function from the fitting function. The maximum value of the vertical axis in the range of the 1300 to 1400 $cm^{-1}$ in the fitting spectrum is defined as ID. The maximum value of the vertical axis in the range of the 1570 to 1620 $cm^{-1}$ in the fitting spectrum is defined as IG. R value (ID/IG) is obtained by dividing ID by IG.

As an example of the hard carbon, for example, carbon microbeads made of a non-graphitized carbon material can be given. As a specific example, ICB (product name: NICA-BEADS) available from Nippon Carbon Co., Ltd. can be given. As examples of the shapes of the grains that form the carbon material, for example, flakes represented by natural graphite whose phase gap is wide, spheres represented by meso-carbon microbeads, fibers represented by graphitized carbon fibers, and an aggregate of fine powder can be given. When the shape of grains constituting the carbon material is spherical, the average grain diameter is preferably 0.01 μm or more and 30 μm or less, more preferably 0.1 μm or more and 20 μm or less.

Specific examples of the metal that is used in the negative electrode active material include tin, lead, silicon, germanium, phosphorus, bismuth, antimony and the like. Examples of the alloy include an alloy composed of two or more metals selected from the group consisting of the above-described metals and an alloy composed of two or more metals selected from the group consisting of the above-described metals and transition metals. Alloys such as Si—Zn, $Cu_2Sb$, and $La_3Ni_2Sn_7$ or the like are also given. These metals and alloys are carried on the collector together with the carbon material and used as an electrode active material.

Examples of the oxide used in the negative electrode active material include $Li_4TiO_{12}$, $Na_2Ti_3O_7$ and the like. Examples of the sulfide include $TiS_2$, $NiS_2$, $FeS_2$, $Fe_3S_4$ and the like. Examples of the nitride include $Na_{3-x}M_xN$ (M represents a transition metal element, $0 \leq x \leq 3$) such as $Na_3N$, $Na_{2.6}Co_{0.4}N$.

The carbon material, metal, oxide, sulfide, and nitride which are negative electrode active materials may be used together and they may be crystalline or noncrystalline. From the view point of cycle characteristics, as the negative electrode active material, the carbon material is preferably used and hard carbon is more preferably used.

These carbon material, metal, oxide, sulfide and nitride are mainly carried on a collector and used as an electrode.

The negative electrode mixture may contain a binder and a conductive material as necessary. As the binder and the conductive material, materials similar to those used in the positive electrode mixture can be recited.

Preferred examples of the binder contained in the negative electrode mixture include polyacrylic acid, sodium polyacrylate, lithium polyacrylate, potassium polyacrylate, polyethylene oxide, polypropylene oxide, ethylene oxide-propylene oxide copolymer, ethylene oxide-alkylene oxide copolymer, carboxymethyl cellulose, hydroxymethyl cellulose, hydroxyethyl cellulose, hydroxypropyl cellulose, ethylene-vinyl acetate copolymer, styrene-butadiene copolymer, polyvinylidene fluoride, polytetrafluoroethylene, vinylidene fluoride-hexafluoropropylene copolymer, vinylidene fluoride-tetrafluoroethylene copolymer, vinylidene fluoride-hexafluoropropylene-tetrafluoroethylene copolymer and the like. More preferably, those swelling in the nonaqueous electrolyte solution are recited, and examples include polyethylene oxide, polypropylene oxide, ethylene oxide-propylene oxide copolymer, ethylene oxide-alkylene oxide copolymer, polyvinylidene fluoride, vinylidene fluoride-hexafluoropropylene copolymer, vinylidene fluoride-tetrafluoroethylene copolymer, and vinylidene fluoride-hexafluoropropylene-tetrafluoroethylene copolymer. These may be used alone or in combination of two or more kinds.

The proportion of the binder in the negative electrode mixture is usually 0.5 to 20 parts by weight, preferably 1 to 15 parts by weight, more preferably 2 to 12 parts by weight with respect to 100 parts by weight of the negative electrode mixture.

As the solvent used in the negative electrode mixture paste, those similar to the solvents used in the positive electrode mixture paste can be recited.

As a negative electrode collector, Al, Al alloy, Cu, Ni and stainless can be recited. Al is preferred in the point that it is easily processed into a thin film, and is low in price. Examples of the shape of the collector include a foil shape, a plate shape, a mesh shape, a net shape, a lath shape, a punching metal shape, an embossed shaped and combinations thereof (for example, meshed plate). Unevenness may be formed on the surface of the collector by an etching treatment.

<Separator>

As a separator that can be used in the sodium secondary battery of the present invention, for example, a material in the form of a porous film, a nonwoven fabric, a woven fabric or the like, made of polyolefin resins such as polyethylene or polypropylene, fluorine resin, nitrogen-containing aromatic polymer or the like can be used. Also, a single-layered or laminated separator using two or more of these materials is applicable. As an example of a separator, for example, separators described in JP-A-2000-30686, JP-A-10-324758 and so on can be given. The thickness of the separator is preferably as small as possible as long as the mechanical strength is kept in the point that the volume energy density of the battery increases and the internal resistance decreases. Generally, the thickness of the separator is preferably about 5 to 200 µm, more preferably about 5 to 40 µm.

The separator preferably has a porous film containing a thermoplastic resin. The separator more preferably has a laminated porous film which is formed by laminating a heat-resistant porous layer containing a heat-resistant resin and the porous film containing the thermoplastic resin. In a secondary battery, it is generally important to interrupt the current and prevent the excessive current from flowing (to shut down) when abnormal current flows in the battery due to a short circuit between the positive electrode and the negative electrode or the like. Therefore, the separator is required to shut down at as low as possible temperature when the normal use temperature is exceeded (to occlude the micropores of the porous film when the separator has the porous film containing the thermoplastic resin) and to keep the shutdown state even when the internal temperature of the battery rises to some degree of high temperature after the shutdown without being broken due to the temperature, or in other words, to have high heat resistance. By using a separator including a laminated porous film which is formed by laminating the heat-resistant porous layer containing the heat-resistant resin, and the porous film containing the thermoplastic resin, as the separator, it is possible to further prevent the heat breakage of the film of the secondary battery of the present invention. Here, the heat-resistant porous layer may be laminated on both faces of the porous film.

As the separator, the one carrying the polymer compound in the nonaqueous electrolyte solution may be used. As a method for carrying the polymer compound on the separator, a method of applying a polymer compound solution in which the polymer compound is dissolved in a solvent on the separator followed by drying is recited. As the solvent used in the polymer compound solution, those similar to the solvents used in the negative electrode mixture paste can be given. While the method for applying the polymer compound solution on the separator is not particularly limited, for example, methods similar to those recited as the method for applying the negative electrode mixture paste to the collector can be given. The proportion of the polymer compound carried on the separator obtained by the present technique is normally 20 to 300 parts by weight, preferably 50 to 200 parts by weight with respect to 100 parts by weight of the separator.

EXAMPLES

Hereinafter, the present invention will be described more specifically by way of examples. Evaluations of a sodium-containing transition metal compound and hard carbon, and measurement of viscosity of a nonaqueous electrolyte solution were conducted by the following measurements.

1. Powder X-Ray Diffraction Measurement of Sodium-Containing Transition Metal Compound and Hard Carbon Powder X-ray diffraction measurement of a sodium-containing transition metal compound was conducted by using type RINT2500TTR available from Rigaku Corporation. A special holder was charged with the sodium-containing transition metal compound and measurement was conducted with a diffraction angle 2θ ranging from 10 to 90° by using a CuKα radiation source to obtain a powder X-ray diffraction graphic. For hard carbon, a powder X-ray diffraction graphic was obtained in the same manner as described above.

2. Composition Analysis of Sodium-Containing Transition Metal Compound

After dissolving powder in hydrochloric acid, measurement was conducted by using inductively coupled plasma-atomic emission spectroscopy (available from SII, SPS3000, hereinafter, also referred to as ICP-AES).

<Production Example 1> (Production of Composite Metal Oxide $C^1$ and Positive Electrode $CE^1$)

In a polypropylene beaker, 44.88 g of potassium hydroxide was added to 300 mL of distilled water and dissolved by stirring to completely dissolve potassium hydroxide, and thus a potassium hydroxide aqueous solution (precipitator) was prepared. In another polypropylene beaker, 21.21 g of iron (II) chloride tetrahydrate, 19.02 g of nickel chloride (II) hexahydrate, and 15.83 g of manganese chloride (II) tetrahydrate were added to 300 mL of distilled water and dissolved by stirring to obtain an iron-nickel-manganese-containing aqueous solution. By adding the iron-nickel-manganese-containing aqueous solution dropwise to the precipitator under stirring the precipitator, a slurry in which a precipitate was formed was obtained. Then the slurry was filtered, washed with distilled water, and dried at 100° C. to obtain a precipitate which is a precursor of a metal-containing compound. After weighing the precipitate, sodium carbonate and calcium hydroxide so that Fe:Na:Ca was 0.4:0.99:0.01 by molar ratio, they were dry-mixed in an agate mortar to obtain a mixture. Then the mixture was put into a firing vessel made of alumina and firing was conducted by retaining in an air atmosphere at 850° C. for 6 hours by using an electric furnace. Then, the mixture was cooled to room temperature to obtain composite metal oxide $C^1$. Powder X-ray diffraction analysis conducted for the composite metal oxide $C^1$ revealed the attribution to α-NaFeO$_2$ type crystal structure. As a result of analysis of the composition of the composite metal oxide $C^1$ by ICP-AES, the molar ratio of Na:Ca:Fe:Ni:Mn was 0.99:0.01:0.4:0.3:0.3. Then, using the composite metal oxide $C^1$ obtained in the above-described manner, acetylene black as a conductive material, vinylidene fluoride-tetrafluoroethylene copolymer as a binder solution, and NMP as a solvent, a positive electrode mixture paste was prepared. Weighing was conducted so that the composition of composite metal oxide $C^1$:conductive material:binder:NMP was 90:5:5:100 (weight ratio) and they were mixed by stirring at 4,000 rpm for 5 minutes by using a Dispermat (available from VMA-GETZMANN) to obtain a positive electrode mixture paste. The obtained positive electrode mixture paste was applied on aluminum foil with a thickness of 20 &m by using a doctor blade and dried for 2 hours at 60° C. Then, the aluminum foil was rolled at a pressure of 200 kN/m by using a roll press (SA-602, available from TESTER SANGYO CO., LTD.) to obtain a positive electrode $CE^1$.

<Production Example 2> (Production of Carbon Material $A^1$ and Negative Electrode $AE^1$)

ICB (Product name: NICABEADS) available from Nippon Carbon Co., Ltd. was introduced into a firing furnace and the interior of the furnace was brought into an argon gas atmosphere. Then, the temperature was raised from the room temperature to 1600° C. at a rate of 5° C./min. while an argon gas was circulated at a rate of 0.1 L/g (weight of carbon material) per minute. The temperature was retained at 1600° C. for 1 hour and then the ICB was cooled to obtain carbon material $A^1$. Powder X-ray diffraction measurement of the carbon material $A^1$ revealed that the interlayer distance d (002) was 0.368 nm and the size Lc of the crystal in the c-axial direction was 1.17 nm. Also, it was revealed that R value (ID/IG) obtained by Raman spectroscopy was 1.41. An electrode mixture paste was prepared using the carbon material $A^1$, polyvinylidene fluoride (available from KUREHA CORPORATION, KF polymer W#1300) as a binder, and NMP (available from KISHIDA CHEMICAL Co., Ltd.) as a solvent. Weighing was conducted so that the composition of carbon material $A^1$:binder:NMP was 90:10:100 (weight ratio). They were stirred and mixed by using a Dispermat (available from VMA-GETZMANN) to obtain a negative electrode mixture paste. The stirring condition of the rotating blade was 2,000 rpm for 10 minutes. The obtained negative electrode mixture paste was applied on an aluminum foil with a thickness of 20 µm by using a doctor blade, dried at 60° C. for 2 hours, and then rolling at 100 kN/m was conducted by using a roll press (SA-602, available from TESTER SANGYO CO., LTD.) to obtain a negative electrode $AE^1$.

Example 1

(Preparation of Nonaqueous Electrolyte Solution 1)

To 1.0 mol/L of NaPF/propylene carbonate solution (available from KISHIDA CHEMICAL Co., Ltd.), a compound having a sulfur-oxygen bond (methylene bis(benzeneslufonate)) (available from Wako Pure Chemical Industries, Ltd.) was added and stirred so that ($NaPF_6$/propylene carbonate):methylene bis(benzeneslufonate) was 99.9:0.1, and stirred and dissolved to prepare a nonaqueous electrolyte solution 1. The proportion of propylene carbonate (the nonaqueous solvent) was 87.7% by weight with respect to $NaPF_6$/propylene carbonate solution (the nonaqueous electrolyte solution).
(Production of Sodium Secondary Battery)

The above-described positive electrode $CE^1$ and negative electrode $AE^1$ was laminated with sandwiching separators which is a polyethylene porous film with a thickness of 20 µm which is a heat-resistant porous film containing a thermoplastic resin therebetween. The obtained laminated body was stored in an aluminum laminate pack and immersed in the nonaqueous electrolyte solution 1 to produce a sodium secondary battery 1. The sodium secondary battery was assembled in a glove box in an argon atmosphere.

<Example 2> (Preparation of Nonaqueous Electrolyte Solution 2 and Production of Sodium Secondary Battery 2 Using Nonaqueous Electrolyte Solution 2)

A nonaqueous electrolyte solution 2 was prepared in the similar manner to Example 1 except that the weight ratio of 1.0 mol/L of $NaPF_6$/propylene carbonate (available from KISHIDA CHEMICAL Co., Ltd.):methylene bis(benzeneslufonate) (available from Wako Pure Chemical Industries, Ltd.) was 99.5:0.5. A secondary battery 2 was produced by using the nonaqueous electrolyte solution 2.

<Example 3> (Preparation of Nonaqueous Electrolyte Solution 3 and Production of Sodium Secondary Battery 3 Using Nonaqueous Electrolyte Solution 3)

A nonaqueous electrolyte solution 3 was prepared in the similar manner to Example 1 except that the weight ratio of 1.0 mol/L of $NaPF_6$/propylene carbonate (available from KISHIDA CHEMICAL Co., Ltd.):methylene bis(benzeneslufonate) (available from Wako Pure Chemical Industries, Ltd.) was 99.0:1.0. A secondary battery 3 was produced by using the nonaqueous electrolyte solution 3.

<Example 4> (Preparation of Nonaqueous Electrolyte Solution 4 and Production of Sodium Secondary Battery 4 Using Nonaqueous Electrolyte Solution 4)

A nonaqueous electrolyte solution 4 was prepared in the similar manner to Example 3 except that methylene bis(2-trifluorometylbenzeneslufonate) was used in place of methylene bis(benzeneslufonate). A secondary battery 4 was produced by using the nonaqueous electrolyte solution 4.

<Example 5> (Preparation of Nonaqueous Electrolyte Solution 5 and Production of Sodium Secondary Battery 5 Using Nonaqueous Electrolyte Solution 5)

A nonaqueous electrolyte solution 5 was prepared in the similar manner to Example 3 except that methyl benzeneslufonate was used in place of methylene bis(benzeneslufonate). A secondary battery 5 was produced by using the nonaqueous electrolyte solution 5.

<Example 6> (Preparation of Nonaqueous Electrolyte Solution 6 and Production of Sodium Secondary Battery 6 Using Nonaqueous Electrolyte Solution 6)

A nonaqueous electrolyte solution 6 was prepared in the similar manner to Example 3 except that dimethyl sulfoxide was used in place of methylene bis(benzeneslufonate). A secondary battery 6 was produced by using the nonaqueous electrolyte solution 6.

<Comparative Example 1> (Production of Sodium Secondary Battery 7)

The secondary battery 7 was produced in the similar manner to Example 1 except that only 1.0 mol/L of $NaPF_6$/ propylene carbonate (available from KISHIDA CHEMICAL Co., Ltd.) was used as the nonaqueous electrolyte solution.

<Charge-Discharge Test>

Prior to conducting a charge-discharge test, an operation for stabilizing actuation of the sodium secondary batteries 1 to 7 was conducted (stabilizing operation) and then a charge-discharge cycle test was conducted.

<Stabilizing Operation>

An electrification operation including constant current charging at a 0.05 C rate (the speed with which the battery is fully charged for 20 hours) from the rest potential up to 3.2 V, followed by constant current discharging down to 2.0 V at a 0.1 C rate (the speed with which the battery is fully charged for 10 hours) was conducted one cycle. Further, an electrification operation including constant current charging at a 0.05 C rate up to 3.8 V, followed by constant current discharging down to 2.0 V at 0.1 C rate was conducted one cycle. Finally, an electrification operation including constant current-constant voltage charging (charging ends when 0.02 C current value was reached) at a 0.05 C rate up to 3.9 V, followed by constant current discharging down to 2.0 V at 0.1 C rate was conducted two cycles.

<Charge-Discharge Cycle Test>

A charge-discharge cycle test was conducted using the sodium secondary batteries 1 to 7 in the following conditions.

At a room temperature, a charge-discharge test including constant current-constant voltage charging at a 0.2 C rate (charging ends when 0.02 C current value was reached) up to 3.9 V, followed by constant current discharging at a 0.2 C rate down to 2.0 V was conducted 50 cycles or 100 cycles. Table 1 shows a retained percentage of discharge capacity before and after the charge-discharge cycle test (0.2 C discharge capacity after the cycle test/0.2 C discharge capacity before the cycle test×100(%)) as cycle characteristics.

TABLE 1

| | | Added amount of compound having —(S=O)— bond | Cycle characteristic (50 cycles) |
|---|---|---|---|
| Example 1 | Sodium secondary battery 1 | 0.1 wt % | 34% |
| Example 2 | Sodium secondary battery 2 | 0.5 wt % | 91% |
| Example 5 | Sodium secondary battery 5 | 1.0 wt % | 96% |
| Comparative Example 1 | Sodium secondary battery 7 | — | 16% |

TABLE 2

| | | Added amount of compound having —(S=O)— bond | Cycle characteristic (100 cycles) |
|---|---|---|---|
| Example 3 | Sodium secondary battery 3 | 1.0 wt % | 96% |
| Example 4 | Sodium secondary battery 4 | 1.0 wt % | 100% |
| Example 6 | Sodium secondary battery 6 | 1.0 wt % | 100% |

INDUSTRIAL APPLICABILITY

According to the present invention, the nonaqueous electrolyte solution for the sodium secondary battery and the sodium secondary battery which have excellent charge-discharge cycle characteristics can be provided and is useful industrially.

The invention claimed is:

1. A nonaqueous electrolyte solution for a sodium secondary battery comprising:
   a sodium salt,
   a compound having a sulfur-oxygen bond, and
   a nonaqueous solvent, wherein
   an amount of the compound having the sulfur-oxygen bond is m a range of 0.05% by weight or more and 10% by weight or less with respect to the nonaqueous electrolyte solution,
   the compound having a sulfur-oxygen bond is at least one selected from the group consisting of a compound represented by formula (B) and a compound represented by formula (D) as shown below,

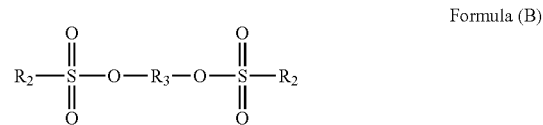

Formula (B)

wherein in the formula, $R_2$ represents an optionally substituted alkyl group having 1 to 20 carbon atoms or an optionally substituted aryl group having 6 to 20 carbon atoms; $R_3$ represents an optionally substituted alkylene group having 1 to 10 carbon atoms; and multiple $R_2$s may be the same or different from each other;

Formula (D)

wherein in the formula, $R_5$ represents an optionally substituted alkyl group having 1 to 20 carbon atoms or an optionally substituted aryl group having 6 to 20 carbon atoms; and multiple $R_5$s may be the same or different from each other.

2. The nonaqueous electrolyte solution for the sodium secondary battery according to claim 1, wherein
   the compound represented by formula (B) is a compound represented by the following formula (E),

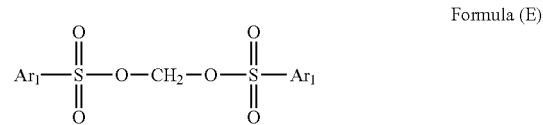

Formula (E)

wherein in the formula, $Ar_1$ represents an optionally substituted aryl group having 6 to 20 carbon atoms, and multiple $Ar_1$s may be the same or different from each other.

3. The nonaqueous electrolyte solution for the sodium secondary battery according to claim 2, wherein
   the sodium salt is the sodium salt including at least one selected from the group consisting of $NaPF_6$, $NaBF_4$, $Na(FSO_2)_2N$, and $Na(CF_3SO_2)_2N$.

4. The nonaqueous electrolyte solution for the sodium secondary battery according to claim 1, wherein the sodium salt is a sodium salt including at least one selected from the group consisting of $NaPF_6$, $NaBF_4$, $Na(FSO_2)_2N$, and $Na(CF_3SO_2)_2N$.

5. A sodium secondary battery comprising:
a positive electrode including a positive electrode active material which is capable of being doped and undoped with sodium ions;
a negative electrode including a negative electrode active material which is capable of being doped and undoped with sodium ions; and
the nonaqueous electrolyte solution for the sodium secondary battery according to claim 1.

6. The sodium secondary battery according to claim 5, wherein
the negative electrode comprises a hard carbon as the negative electrode active material and a binder.

7. The sodium secondary battery according to claim 6, wherein
the positive electrode comprises the positive electrode active material, a conductive material, and a binder,
the positive electrode active material is represented by the following formula (I), $$Na_aM^1{}_bM^2O_2 \qquad \text{formula (I)}$$

wherein, $M^1$ represents at least one element selected from the group consisting of Mg, Ca, Sr and Ba, $M^2$ represents at least one element selected from the group consisting of Mn, Fe, Co, Cr, V, Ti and Ni, a is a value in the range of 0.5 or more and 1.05 or less, b is a value in the range of 0 or more and 0.5 or less, and a+b is a value in the range of 0.5 or more and 1.10 or less.

8. The sodium secondary battery according to claim 5, wherein
the positive electrode comprises the positive electrode active material, a conductive material, and a binder,
the positive electrode active material is represented by the following formula (I), $$Na_aM^1{}_bM^2O_2 \qquad \text{formula (I)}$$

wherein, $M^1$ represents at least one element selected from the group consisting of Mg, Ca, Sr and Ba, $M^2$ represents at least one element selected from the group consisting of Mn, Fe, Co, Cr, V, Ti and Ni, a is a value in the range of 0.5 or more and 1.05 or less, b is a value in the range of 0 or more and 0.5 or less, and a+b is a value in the range of 0.5 or more and 1.10 or less.

9. A sodium secondary battery comprising:
a positive electrode including a positive electrode active material which is capable of being doped and undoped with sodium ions;
a negative electrode including a negative electrode active material which is capable of being doped and undoped with sodium ions; and
the nonaqueous electrolyte solution for the sodium secondary battery according to claim 2.

* * * * *